US00RE43099E

(19) United States
(12) Reissued Patent
Laroia et al.

(10) Patent Number: US RE43,099 E
(45) Date of Reissued Patent: Jan. 10, 2012

(54) SPEECH CODER METHODS AND SYSTEMS

(75) Inventors: Rajiv Laroia, Far Hills, NJ (US); Boon-Lock Yeo, Los Altos Hills, CA (US)

(73) Assignee: Alcatel Lucent, Paris (FR)

(21) Appl. No.: 12/313,140

(22) Filed: Nov. 17, 2008

Related U.S. Patent Documents

Reissue of:
(64) Patent No.: 5,839,098
Issued: Nov. 17, 1998
Appl. No.: 08/770,615
Filed: Dec. 19, 1996

(51) Int. Cl.
*G10L 19/02* (2006.01)
*G10L 19/00* (2006.01)

(52) U.S. Cl. ..... 704/203; 704/219; 704/220

(58) Field of Classification Search ..... 704/200, 704/203, 219–223
See application file for complete search history.

(56) References Cited

U.S. PATENT DOCUMENTS

| | | | | |
|---|---|---|---|---|
| 3,624,302 | A | 11/1971 | Atal | 179/1 SA |
| 4,220,819 | A | 9/1980 | Atal | 704/219 |
| 4,472,832 | A | 9/1984 | Atal et al. | 704/221 |
| RE32,580 | E | 1/1988 | Atal et al. | 381/40 |
| 4,827,517 | A | 5/1989 | Atal et al. | 381/41 |
| 5,255,339 | A | 10/1993 | Fette et al. | 395/2 |
| 5,267,317 | A | 11/1993 | Kleijn | 381/38 |
| 5,371,853 | A | 12/1994 | Kao et al. | 704/223 |
| 5,481,642 | A | 1/1996 | Shoham | 395/2.28 |
| 5,495,556 | A | 2/1996 | Honda | 704/265 |
| 5,513,297 | A | 4/1996 | Kleijn et al. | 395/2.32 |

FOREIGN PATENT DOCUMENTS

| | | |
|---|---|---|
| GB | 0533363 | 8/1992 |
| GB | EP0533363 A | 8/1992 |
| JP | 4055899 A | 2/1992 |
| JP | 05-197400 | 8/1993 |
| JP | 06-138896 | 5/1994 |
| JP | 07147566 A | 6/1995 |
| JP | 07111462 A | 8/1995 |
| JP | 07-295574 | 11/1995 |
| JP | 7295594 | 11/1995 |

(Continued)

OTHER PUBLICATIONS

Wu, et al., "An investigation of Sinusoidal speech coding" *Proceedings Of Fourth International Symposium on Signal Processing And Its Applications*, vol. 1, pp. 9-12 (1996).

(Continued)

*Primary Examiner* — Angela A Armstrong
(74) *Attorney, Agent, or Firm* — Martin I. Finston

(57) ABSTRACT

Coding systems that provide a perceptually improved approximation of the short-term characteristics of speech signals compared to typical coding techniques such as linear predictive analysis while maintaining enhanced coding efficiency. The invention advantageously employs a non-linear transformation and/or a spectral warping process to enhance particular short-term spectral characteristic information for respective voiced intervals of a speech signal. The non-linear transformed and/or warped spectral characteristic information is then coded, such as by linear predictive analysis to produce a corresponding coded speech signal. The use of the non-linear transformation and/or spectral warping operation of the particular spectral information advantageously causes more coding resources to be used for those spectral components that contribute greater to the perceptible quality of the corresponding synthesized speech. It is possible to employ this coding technique in a variety of speech coding techniques including, for example, vocoder and analysis-by-synthesis coding systems.

37 Claims, 5 Drawing Sheets

FOREIGN PATENT DOCUMENTS

| | | | |
|---|---|---|---|
| JP | 08-016195 | | 1/1996 |
| JP | 08006596 | A | 1/1996 |
| JP | 08-044394 | | 2/1996 |
| JP | 08-147886 | | 6/1996 |
| JP | 08-166799 | | 6/1996 |
| JP | 8147883 | | 6/1996 |
| JP | 08-220199 | | 8/1996 |
| WO | WO 92/10830 | | 6/1992 |

OTHER PUBLICATIONS

Hicks, et al., "Pitch Invariant frequency lowering with nonuniform spectral compression", *International Conference On Acoustics, Speech and Signal Processing*, vol. 1, pp. 121-124 (1981).
Nelson, "The Mellin-wavelet transform" *International Conference On Acoustics, Speech, And Signal Processing*, vol. 2, pp. 1101-1104 (1995).
B. Atal et al., "Stochastic Coding of Speech Signals at Very Low Bit Rates", *Proc IEEE Int. Conf. Comm.*, pp. 1610-1613 (May 1984).
M. Schroeder et al., "Code-Excited Linear Predictive (CELP): High Quality Speech at Very Low Bit Rates", *Proc. IEEE Int. Conf. ASSP.*, pp. 937-940 (1985).
P. Kroon et al., "A Class of Analysis-by-Synthesis Predictive Coers for High-Quality Speech Coding at Rate Between 4.8 and 16 KB/s", IEEE J. on Sel. Areas in Comm., SAC-6(2), pp. 353-363 (Feb. 1988).
L. R. Rabiner et al., *Digital Processing of Speech Signals*, pp. 150-157, sects. 6.0-6.1, pp. 250-282, pp. 372-378, pp. 404-407, and pp. 447-450 (Prentice-Hall, New Jersey, 1978).
Japan Examiner's Office Letter dated Dec. 18, 2008.
Japan Examiner's Refusal Decision dated Jul. 28, 2009.
Japan Appeal Examiner's Office Letter dated Apr. 14, 2010.
Japan Appeal Examiner's Office Letter dated Mar. 7, 2011.
Wu, et al. "An investigation of sinusoidal speech coding" *Proceedings Of Fourth International Symposium On Signal Processing And Its Applications*, vol. 1, pp. 25-30 Aug. 1996.
B. Atal, et al. "Stochastic Coding of Speech Signals at Very Low Bit Rates", *Proc IEEE Int. Conf. Comm.*, p. 48.1 (May 1984).

SPEECH CODER METHODS AND SYSTEMS

Matter enclosed in heavy brackets [ ] appears in the original patent but forms no part of this reissue specification; matter printed in italics indicates the additions made by reissue.

FIELD OF THE INVENTION

The invention relates generally to speech communication systems and more specifically to systems for encoding and decoding speech.

BACKGROUND OF THE INVENTION

Digital speech communication systems including voice storage and voice response systems use speech coding and data compression techniques to reduce the bit rate needed for storage and transmission. Voiced speech is produced by a periodic excitation of the vocal tract by the vocal chords. As a consequence, a corresponding signal for voiced speech contains a succession of similarly but evolving waveforms having a substantially common period which is referred to as the pitch period. Typical speech coding systems take advantage of short-term redundancies within a pitch period interval to achieve data compression in a coded speech signal.

In a typical voice coder (vocoder) system, such as that described in U.S. Pat. No. 3,624,302, which is incorporated by reference herein, the speech signal is partitioned into successive fixed duration intervals of 10 msec. to 30 msec. and a set of coefficients are generated approximating the short-term frequency spectrum resulting from the short-term redundancies or correlation in each interval. These coefficients are generated by linear predictive analysis and referred to as linear predictive coefficients (LPC's). The LPC's represent a time-varying all-pole filter that models the vocal tract. The LPC's are useable for reproducing the original speech signal by employing an excitation signal referred to as a prediction residual. The prediction residual represents a component of the original speech signal that remains after removal of the short-term redundancy by linear predictive analysis.

In vocoders, the prediction residual is typically modeled as white noise for unvoiced sounds and a periodic sequence of impulses for voiced speech. A synthesized speech signal can be generated by a vocoder synthesizer based on the modeled residual and the LPC's of the linear predictive filter modeling the vocal tract. Vocoders approximate the spectral information of an original speech signal and not the time-domain waveform of such a signal. Moreover, a speech signal synthesized from such codes often exhibits a perceptible synthetic quality that is, at times, difficult to understand.

Alternative known speech coding techniques having improved perceptual speech quality approximate the waveform of a speech signal. Conventional analysis-by-synthesis systems employ such a coding technique. Typical analysis-by-synthesis systems are able to achieve synthesized speech having acceptable perceptual quality. Such systems employ both linear predictive analysis for coding the short-term redundant characteristics of the pitch period as well as a long-term predictor (LTP) for coding long term pitch correlation in the prediction residual. In LTP's, characteristics of past pitch periods are used to provide an approximation of characteristics of a present pitch period. Typical LTP's have included an all-pole filter providing delayed feedback of past pitch-period characteristics, or a codebook of overlapping vectors of past pitch-period characteristics.

In particular analysis-by-synthesis systems, the prediction residual is modeled by an adaptive or stochastic codebook of noise signals. The optimum excitation is found by searching through the codebook of candidate excitation vectors for successive speech intervals referred to as frames. A code specifying the particular codebook entry of the found optimum excitation is then transmitted on a channel along with coded LPC's and the LTP parameters. These particular analysis-by-synthesis systems are referred to as code-excited linear prediction (CELP) systems. Exemplary CELP coders are described in greater detail in B. Atal and M. Schroeder, "Stochastic Coding of Speech Signals at Very Low Bit Rates", Proceedings IEEE Int. Conf Comm., p. 48.1 (May 1984); M. Schroeder and B. Atal, "Code-Excited Linear Predictive (CELP): High Quality Speech at Very Low Bit Rates", Proc. IEEE Int. Conf ASSP., pp. 937-940 (1985) and P. Kroon and E. Deprettere, "A Class of Analysis-by-Synthesis Predictive Coders for High-Quality Speech Coding at Rate Between 4.8 and 16 KB/s", IEEE J on Sel. Areas in Comm., SAC-6(2), pp. 353-363 (Feb. 1988), which are all incorporated by reference herein.

However, in vocoder and analysis-by-synthesis systems as well as other types of speech coding systems, there is a recognized need for methods of coding characteristics of the short-term frequency spectrum with enhanced perceptual accuracy.

SUMMARY OF THE INVENTION

As shown in FIG. 9, the invention concerns coding systems that provide improved perceptual coding of short-term spectral characteristics of speech signals compared to conventional coding techniques while maintaining advantageous coding efficiencies. The invention employs processing of successive frames of a speech signal by performing a non-linear transformation 301 and/or spectral warping process 302 on a sequence 303 of spectral magnitude values characterizing the short-term frequency spectrum of respective voiced speech frames prior to spectral coding 304 by, for example, linear predictive analysis. Spectral warping spreads or compresses particular frequency ranges represented in the spectral characterization sequence based on the effect such frequency ranges have on the perceptual quality of corresponding speech synthesized from the coded signal.

In particular, spectral warping spreads frequency ranges that substantially effect the perceptual quality of corresponding synthesized speech and compress perceptually less significant frequency ranges. In a corresponding manner, the non-linear transformation performs a magnitude warping operation on the spectral magnitude values. Such transformation amplifies and/or attenuates spectral magnitude values to enhance the characterization of the perceptual quality of a corresponding synthesized speech signal.

The invention is based on the realization that typical coding methods, including linear predictive analysis, perform coding of the short-term frequency spectrum of a speech signal with substantially equal coding resources used for respective frequency components whether such frequency components substantially effect the perceptual quality of a speech signal synthesized from the coded signal or otherwise. In other words, typical coding techniques do not perform coding of frequency components of the short-term frequency spectrum characterization based on the perceptual accuracy such frequency components produce in a corresponding synthesized speech signal.

In contrast, the present invention processes the spectral component values by spectral warping and/or non-linear transformation to produce a transformed and/or warped characterization that causes subsequent spectral coding, such as by linear predictive analysis, to provide more coding resources for perceptually more significant spectral components and less coding resources to those spectral components that are less perceptually significant. Accordingly, the resulting synthesized voiced speech produced from such a coded signal would have an improved perceptual quality while maintaining an advantageous coding efficiency relative to the coding process alone.

A corresponding decoder according to the invention employs a complementary inverse non-linear transformation and/or spectral warping process to obtain the corresponding approximation of the original short-term frequency spectrum of the respective frames of the speech signal with improved perceptual quality.

It is possible to employ the coding technique of the invention in a variety of spectral coding arrangements including, for example, vocoder and analysis-by-synthesis coding systems, or other techniques where linear prediction analysis has been used for characterizing the short-term frequency spectrum of a speech signal.

Additional features and advantages of the present invention will become more readily apparent from the following detailed description and accompanying drawings.

DETAILED DESCRIPTION

Figure 1:
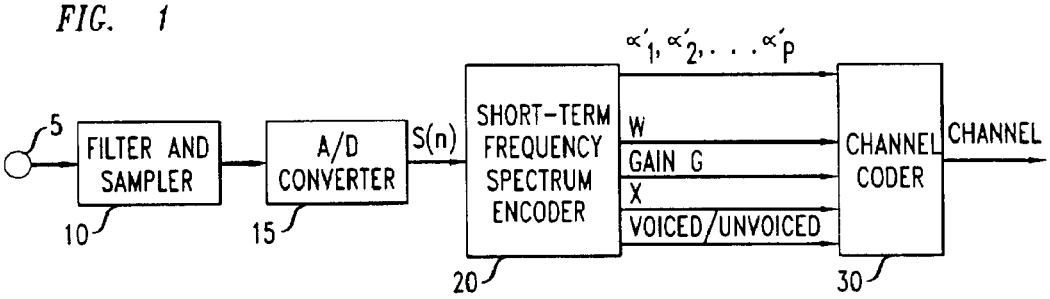
FIG. 1 is a schematic block diagram of an exemplary vocoder configuration employing a short-term frequency spectrum encoder according to the invention.

The invention advantageously employs processing of successive frames of a speech signal by performing a non-linear transformation and/or spectral warping process on a spectral magnitude value sequences characterizing the short-term frequency spectrum of respective voiced speech frames prior to spectral coding by, for example, linear predictive analysis. As used herein, "short-term frequency spectrum" refers to spectral characteristics arising from the short-term correlation in the speech signal excluding the correlation resulting from the pitch periodicity. The short-term frequency spectrum is alternatively referred to as the short-time frequency spectrum in the art, and is described in greater detail in L. R. Rabiner and R. W. Schafer, Digital Processing of Speech Signals, sects. 6.0-6.1, pp. 250-282 (Prentice-Hall, New Jersey, 1978), which is incorporated by reference herein in its entirety.

Spectral warping spreads or compresses particular frequency ranges represented in the spectral magnitude value sequence based on the effect such frequency ranges have on the perceptual accuracy produce in corresponding speech synthesized from the coded signal. In a corresponding manner, the non-linear transformation performs a magnitude warping operation on the spectral magnitude values. Such transformation amplifies and/or attenuates the spectral magnitude values to enhance the characterization for producing an improved perceptual accuracy in corresponding synthesized speech.

The invention is based on the realization that typical coders, including linear predictive coders, code frequency components of a voiced speech signal interval such that perceptually significant frequency components are coded using identical or similar resources to that used for coding perceptually less significant frequency components. In contrast, the invention processes the spectral magnitude values by spectral warping and/or non-linear transformation to produce a transformed and/or warped characterization having an enhanced characterization of at least one particular frequency range that causes the coder to provide more coding resources to perceptually more significant spectral components and less coding resources to those spectral components that are less perceptually significant. Accordingly, synthesized speech produced from such a coded speech signal has an improved perceptual quality relative to the coding process alone while maintaining an advantageous coding efficiency.

The invention is described below with regard to using linear predictive analysis for providing the spectral coding for illustration purposes only and is not intended to be a limitation of the invention. It is alternatively possible to employ numerous other spectral coding techniques that code the frequency components of the short-term frequency spectrum by methods other than coding based on a corresponding perceptual quality or accuracy that such components would have in corresponding synthesized speech. For instance, it is possible to use a spectral coder according to the invention that does not allocate coded signal bits or coding resources based on the perceptual quality of the respective spectral components.

The invention is useable in a variety of coder systems for encoding the short-term vocal tract characteristics of voiced speech including, for example, vocoders or analysis-by-synthesis systems such as CELP coders. Exemplary vocoder and CELP type coder and decoder systems employing the technique of the invention are illustrated in FIGS. 1 and 4, and FIGS. 7 and 8, respectively. These systems are described for illustration purposes only and are not meant to be a limitation on the invention. It is possible to use the invention in other types of coder systems where coding of the short-term frequency spectrum characteristics is desired.

For clarity of explanation, the illustrative embodiments of the invention are shown as including, among other things, individual function blocks. The functions these blocks represent may be provided through the use of either shared or dedicated hardware including hardware capable of executing software instructions. For example, such functions can be performed by digital signal processor (DSP) hardware, such as the Lucent DSP16 or DSP32C, and software performing the operations discussed below, which is not meant to be a limitation of the invention. It is also possible to use very large scale integration (VLSI) hardware components as well as hybrid DSP/VLSI arrangements in accordance with the invention.

An exemplary vocoder-type coder arrangement 1 according to the invention is depicted in FIG. 1. In FIG. 1, a speech pattern such as a spoken message is received by a microphone transducer 5 that produces a corresponding analog speech signal. This analog speech signal is bandlimited and converted into a sequence of pulse samples by filter and sampler circuit 10. It is possible for the band limited filtering to remove frequency components of the speech signal above 4.0 KHz and for the sampling rate $f_s$ to be 8.0 KHz as is typical used for processing speech signals. Each speech signal sample is then transformed into an amplitude representative sequence of digital codes S(n) by analog-to-digital converter 15. The sequence S(n) is commonly referred to as digitized speech. The digitized speech S(n) is supplied to a short-term frequency spectrum processor 20, which determines and codes the corresponding short-term spectral characteristics from the digitized speech S(n) according to the invention.

The processor 20 sequentially processes intervals of the sequence S(n) in frames or blocks corresponding to a substantially fixed duration of time such as in the range of 15 msec. 70 msec. For instance, a 30 msec. frame duration for speech sampled at a rate of 8.0 kHz corresponds to a frame of 240 samples from the sequence S(n) and a frame rate of approximately 33 frames/sec. The processor 20 first determines if the a sequence frame represents speech that is voiced or unvoiced. If the frame represents voiced speech, then the processor 20 determines spectral component values representing a short-term frequency spectrum for at least one pitch period in the frame. Numerous methods can be employed for producing the spectral component values representing the short-term frequency spectrum of the frame. An exemplary method is described in greater detail below with respect to FIG. 2.

Nevertheless, in the encoder 20, the spectral component values representing the short-term frequency spectrum of the frame are then processed by a non-linear transformation and/or spectral warping operation to produce a sequence of transformed and/or warped values or intermediate values according to the invention. A particular spectral warping operation is selected to enhance characterization of at least one particular frequency range of the frame of the speech signal relative to another spectral range. It is advantageous for the enhanced spectral range to be a range that substantially effects the perceptible quality of corresponding synthesized speech.

The processor 20 then determines autocorrelation coefficients corresponding to the transformed and/or warped spectral values. A spectral coding technique such as linear predictive analysis is then performed on the autocorrelation coefficients to produce a coefficient sequence, such as linear predictive coefficients (LPC's), that are quantized to produce the quantized coefficient sequence $\acute{\alpha}_1, \acute{\alpha}_2 \ldots \acute{\alpha}_P$ for the processed frame of the digitized speech signal S(n). The number of coefficients P corresponds to the order of the linear predictive analysis.

The quantized coefficient sequence $\acute{\alpha}_1, \acute{\alpha}_2 \ldots \acute{\alpha}_P$ is provided by the processor 20 to the channel coder 30 which converts the quantized sequence into a form suitable for transmission over a transmission medium or storage in a storage medium. Exemplary conversions for transmission include conversion of the codes into electrical signals for transmitting over a wired or wireless transmission medium or light signals over an optical transmission medium. In a similar manner, exemplary conversions for storage include conversion of the codes into recordable signals for storage into a magnetic or optical data storage medium. Since LPC's are typically not readily amenable to quantization, it is possible to for the LPC's to be transformed in an equivalent quantizable form such as conventional line spectral pair (LSP) or partial correlation (PARCOR) parameters for forming the quantized coefficient sequence $\acute{\alpha}_1, \acute{\alpha}_2 \ldots \acute{\alpha}_P$.

The remaining output signals of the processor 20 includes a warp code signal W indicating the warping function, if any, used to warp the spectral component values representing the short-term frequency spectrum for the respective voiced speech frames. The processor 20 also produces other output signals typically generated in conventional speech coding systems including signals representing whether the processed speech frame includes voiced or unvoiced speech, a gain constant G for the processed frame and a signal X for the pitch period duration if the processed frame is voiced speech.

Figure 2:
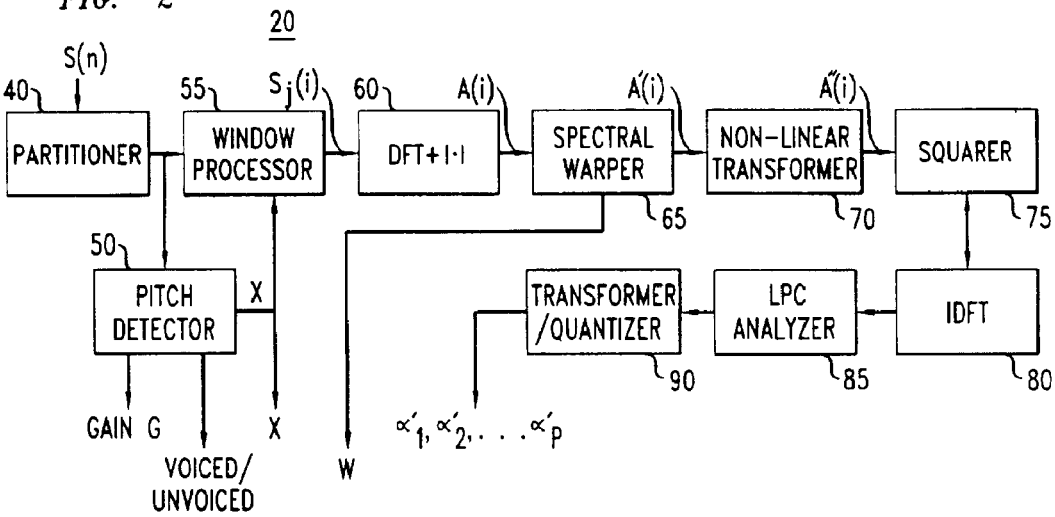
FIG. 2 is a schematic block diagram of an exemplary short-term frequency spectrum encoder according to the invention for use in the vocoder of FIG. 1.

An exemplary configuration for the short-term frequency spectrum processor 20 according to the invention is shown in FIG. 2. Referring to FIG. 2, the received digitized speech S(n) is divided into frames of a fixed number N of digital values by a partitioner 40. The N digital values for S(nj+i), i=1,2, . . . , N, for j-th frame to be processed are provided to a pitch detector 50 and a window processor 55. The use of the previously described non-overlapping frame intervals are for illustration purposes only and it should be readily understood that overlapping frame intervals are also useable in accordance with the invention.

The pitch detector 50 determines if a voiced component is represented in the frame of the speech signal, or if the frame contain entirely unvoiced speech. If the detector 50 detects a voiced speech component, it determines the corresponding pitch period. A pitch period indicates the number of digitized samples in one cycle of the substantially periodic the voiced speech signal. Typically, a pitch period possesses a duration on the order of 3 msec. to 20 msec., which corresponds to 24 to 160 digital samples based on a sampling rate of 8.0 kHz.

Exemplary methods for determining if a frame contains a voiced speech component and for identifying pitch period intervals are described in the previously cited Digital Processing of Speech Signals book, sects. 4.8, 7.2, 8.10.1, pp. 150-157, 372-378, 447-450. It is possible to determine a pitch period interval by examining the long-term correlation in the speech frame and/or by performing linear predictive analysis on the speech frame and identifying the location of pitch impulse in the resulting prediction residual. The pitch detector 50 also determines the gain constant G based on the energy of the of the samples comprising the frame sequence being processed. Methods for such a determination is not critical to practicing the invention. An exemplary method for determining the gain constant G is also described in the previously cited Digital Processing of Speech Signals book, sect. 8.2, pp. 404-407.

The window processor 55 determines a window function that is essentially a pitch period in duration based on a signal X indicating the pitch period determined by the pitch detector 50. The window processor 55 multiplies the digital samples of the frame received from the partitioner 40 with the determined window function to obtain a sequence of digital values $S_j(i)$, i=1, . . . , M, that is essentially a pitch period in duration, where M represents the number of non-zero samples obtained by the window function for the frame j being processed. Typically desirable window functions have gradual roll-offs.

As a consequence, it is possible for the processor 55 to determine a window function that supports larger intervals than a pitch period to obtain the desired sequence $S_j(i)$. Accordingly, although the digital values obtained from such a window function corresponds to a duration longer than a pitch period, such an interval is still referred to as a pitch period interval in this description of the invention.

Moreover, it is advantageous to align the determined window function relative to the frame sequence of digitized speech samples for obtaining essentially a pitch period interval of samples from the beginning of a pitch period to the beginning of a next pitch period. It is possible for the pitch detector 50 to identify the beginnings of consecutive pitch period intervals by identifying respective pitch impulses occurring in a corresponding produced prediction residual using, for example, conventional linear predictive analysis on the speech frame interval.

The sequence $S_j(i)$ produced by the window processor 55 for the frame j is provided to a spectral processor 60. The spectral processor 60 generates the corresponding spectral magnitude values A(i), i=0, 1, . . . , K−1, of the short-term frequency spectrum of the pitch period speech sequence $S_j(i)$ such as by performing a Discrete Fourier transform (DFT) of the sequence and determining the magnitude of the resulting transformed coefficients. The number of spectral values K should be selected to provide a sufficient frequency resolution to adequately characterize the short-term frequency spectrum of the pitch period for coding. Larger values of K provide improved frequency resolution of the short-term frequency spectrum. Typically values of K in the approximate range of 128 to 1024 provide sufficient frequency resolution. If the value K is greater than the number of samples M in the pitch period speech sequence $S_j(i)$, then K-M zeros can be appended to the sequence $S_j(i)$ prior to DFT processing.

The spectral magnitude sequence A(i) represents a sampled version of a continuous, i.e., non-discrete, short-term frequency spectrum A(z). However, the spectral magnitude sequence A(i) will alternatively be referred to as the short-term frequency spectrum for ease of explanation. A conventional DFT processor is useable to generate the desired spectral magnitude values A(i). However, phase components in addition to the desired magnitude components are typically produced by conventional DFT processors and are not required for this particular embodiment of the invention. Accordingly, since the phase component is not required according to the invention, other transforms that directly generate magnitude values are useable for the spectral processor 60. Also, a fast Fourier transform (FFT) processors can be used for the spectral processor 60. A plot of a short-term frequency spectrum A(z) represented by an exemplary sequence of spectral magnitude values A(i) for a pitch period of an exemplary speech signal is shown in FIG. 3A which is described below.

Moreover, the previous described method for producing the spectral magnitude value sequence A(i) characterizing the short-term frequency spectrum of the frame j is for illustration purposes only and is not meant as a limitation of the invention. It should he readily understood that numerous other techniques are useable for producing such a sequence characterizing the short-term frequency spectrum of the frame j.

Referring again to FIG. 2, the sequence of spectral magnitude values A(i) generated by the processor 60 is then provided to spectral warper 65. The spectral warper 65 warps the sequence A(i) to generate a frequency warped sequence of spectral magnitude values A'(i). In producing the sequence, the warper 65 spreads, in frequency, respective spectral magnitude values for at least one frequency range that would enhance the perceptual quality of the corresponding synthesized speech. In a like manner, those spectral magnitude values characterizing a perceptually less significant frequency range are compressed. Such frequency spreading and compressing of the spectral magnitude values causes the subsequently performed linear predictive analysis to provide more of the available coding resources for the perceptually significant frequency ranges and less coding resources for the perceptually less significant frequency ranges.

Figure 3A:
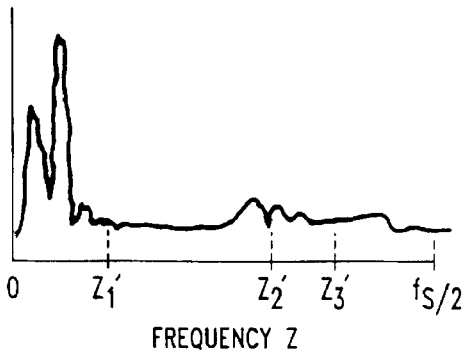
FIGS. 3A and 3B illustrate graphs of exemplary short-term frequency spectrum characterized by spectral magnitude values produced by the encoder of FIG. 2.
Figure 3B:
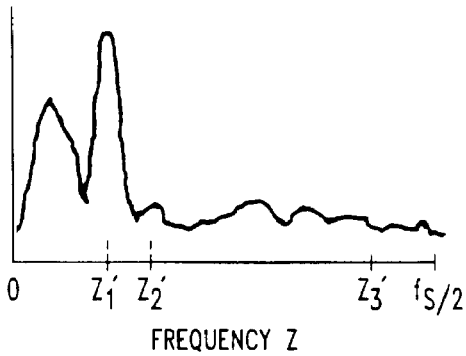

FIG. 3B shows an exemplary frequency warped short-term frequency spectrum A'(z) characterized by warped spectral magnitude based on the short-term frequency spectrum A(z) of FIG. 3A. The exemplary spectral ranges of the sequence A(z) of 0 to $Z_1$ and $Z_2$ to $Z_3$ have relatively high energy and/or a plurality of relatively sharp magnitude peaks that would likely be perceptually significant in the corresponding synthesized speech. In contrast, frequency ranges $Z_1$ to $Z_2$ as well as $Z_3$ to $f_s/2$ have relatively low energy and mostly gradual peaks that are perceptually less significant. Accordingly, the corresponding spectral magnitude values A(i) representing the spectrum A(z) of FIG. 3A are frequency warped to magnitude values A'(i) that represent the warped spectrum A'(z) shown in FIG. 3B. As a consequence, the frequencies $Z_1$, $Z_2$ and $Z_3$ in FIG. 3A have been mapped to frequencies $Z'_1$, $Z'_2$ and $Z'_3$ in FIG. 3B, respectively. Thus, the spectral warper 65 spreads the perceptually more significant ranges of 0 to $Z_1$ and $Z_2$ to $Z_3$ to broader ranges 0 to $Z'_1$ and $Z'_2$ to $Z'_3$, and compresses the perceptually less significant ranges $Z_1$ to $Z_2$ and $Z_3$ to $f_s/2$ in reduced ranges $Z'_1$ to $Z'_2$ and $Z'_3$ to $f_s/2$.

An exemplary method for the spectral warper 65 for warping the spectral magnitude values A(i) representing the spectrum in FIG. 3A to achieve the warped spectral magnitude values A'(i) representing the warped spectrum in FIG. 3B first identifies magnitude value groups representing frequency ranges that would likely be perceptually more or less significant in the corresponding synthesized speech. Accordingly, the warper 65 identifies four groups of magnitude values corresponding to the four frequency ranges identified as perceptually more or less significant as shown in FIG. 3A. Such groups include a first group containing magnitude values $A_1(i)$, i=0, 1, . . . , a, for the frequency range 0 to $Z_1$; a second group containing magnitude values $A_2(i)$, i=a+1, a+2, . . . ,b, for the frequency range $Z_1$ to $Z_2$; a third group containing magnitude values $A_3(i)$, i=b+1, b+2, . . . , c, for the frequency range $Z_2$ to $Z_3$; and a fourth group containing magnitude values $A_4(i)$, i=c+1, c+2, . . . ,k−1, for the frequency range $Z_3$ to $f_s/2$. In the previous discussion, a frequency range u to v includes u but excludes v.

It is possible to compress the frequency ranges $Z_1$ to $Z_2$ and $Z_3$ to $f_s/2$ represented by the second and fourth magnitude value groups $A_2(i)$ and $A_4(i)$ by reducing the number of magnitude values in such groups. For instance, three out of every four consecutive magnitude values can be discarded in such groups. Further, if such a compression technique were used, then the number of values used for such groups can be selected such that the number is a multiple of four. In the alternative, every four consecutive magnitude values in the sequence in such groups can be replaced by one value having a magnitude that is an average of the four values. Such techniques reduce the number of magnitude values for the second and fourth groups by a factor of four.

In a similar manner, it is possible to expand or spread the frequency ranges 0 to $Z_1$ and $Z_2$ to $Z_3$ represented by the first and third magnitude value groups $A_1(i)$ and $A_3(i)$ by increasing the number of magnitude values in such groups. For instance, the processor 65 can add a new magnitude values between every two consecutive values in such groups. As consequence, the number of magnitude values representing the first and third group would be doubled. Moreover, each added magnitude value can he equal to either of the neighboring magnitude values or based on some other relationship of the neighboring magnitude values. For example, it is possible to add a value that is a arithmetic mean of the two neighboring values using linear interpolation.

The warped spectral magnitude values A'(i), i=0, 1, . . . , K'−1, is obtained by concatenating the magnitude values in the four warped groups. The total number of warped spectral magnitude values K' will likely be different than the original number of spectral magnitude values K. Further, it is possible to perform only compression of particular groups or only spreading of other groups to produce the warped spectral magnitude values A'(i) according to the invention.

The previously described warping method first performs the discrete Fourier transformation to generate a sequence of spectral magnitude values A(i) characterizing the short-term frequency spectrum of a digitized speech frame $S_j(n)$, and then increases or decreases the number of spectral magnitude values characterizing particular frequency ranges in the sequence A(i) to produce the desired warped sequence A'(i). However, it is possible according to the invention to advantageously directly produce the warped sequence A'(i) by the discrete Fourier transformation by generating more spectral magnitude values for those frequency ranges to be emphasized and less spectral magnitude values for those frequency ranges to be de-emphasized.

Moreover, the previously described warping methods for spreading and compressing the spectral characterization of the short-term frequency spectrum in a voiced speech frame are based on piece-wise linear warping functions for illustration purposes only. It should be readily understood that the frequency warping can also be performed by other invertible warping functions. For instance, the particular warping process used for the spectral magnitude value sequence A(i) for respective voiced speech frame intervals can be chosen from a codebook of transforms. In such instance, the signal W is generated by the spectral warper 65 in FIG. 2 to indicate a particular index of the codebook transform used to warp the spectral magnitude values A(i) for the corresponding frame. The signal W is transmitted along with the coded speech signal to a decoder which contains a like codebook and a corresponding complimentary inverse warping transformation entry indicated by the index number in the received signal W. Further, it is possible to base the codebook entry selection on a particular property of the current or previously processed speech frame such as, for example, the pitch period duration. Accordingly, the signal W can be omitted when employing such a technique.

The warped sequence spectral magnitude values A'(i) generated by the spectral warper 65 is provided to a non-linear transformer 70 which performs a non-linear transformation on each value in the sequence A'(i) to yield a transformed sequence A"(i). N Exemplary non-linear transformations include the expression $A''(i)=[A'(i)]^N$, where the N is a positive or negative integer or fraction that is not positive one. Accordingly, such a non-linear transformation amplifies or attenuates the spectral magnitudes values based on the values of such magnitudes. For instance, when N=−1, A'(i) is transformed to A"(i)=1/A'(i) for each warped spectral magnitude value and effectively models the sequence A'(i) as an all-zero spectrum by processing with a subsequent linear predictive analyzer 85.

When the value N is negative, the linear predictive analysis of the transformed spectrum represented by the to sequence A"(i) effectively provides an all-zero spectrum representation for the spectrum represented by the sequence A'(i). When the order of the linear predictive analysis is relative small, such as less than 30, it is often advantageous to use a value N corresponding to −1/B, where B is greater than one to reduce the dynamic range of the spectrum. Such a reduction of the dynamic range of the spectrum effectively shortens its time response facilitating the subsequent modeling of the spectrum by an all-zero filter of smaller order. Although the non-linear transformation was previous described with a negative value N, it alternatively possible to use a positive value N, that is not equal to one, to produce a corresponding all-pole spectrum representation according to the invention.

The previously described non-linear transformation is a fixed transformation and is typically known by a corresponding decoder for decoding the coded speech signal according to the invention. However, it is alternatively possible for the non-linear transformation to base the value N on a particular property of the current or previously processed speech frame such as, for example, the pitch period duration X that is provided in the coded signal received from the channel. The value N of the non-linear transformation can also be determined from a codebook of transformation. In such instance, the corresponding codebook index is included in the coded signal produced by the channel coder 30 of FIG. 1. Moreover, it is possible to perform the non-linear transformation with different values N over the frequency ranges in the warped magnitude value sequence A'(i) such that $A''(i)=[A'(i)]^{N(i)}$, where a different value N(i) can be used for different values i.

The transformed and warped sequence A"(i) generated by the transformer 70 provide spectral representation having an enhanced characterization of at least one particular frequency range relative to another frequency range. The spectral magnitude values of the sequence A"(i) are squared by the squarer 75 to produce corresponding power spectral values which are provided to inverse discrete Fourier transform (IDFT) processor 80. The IDFT processor 80 then generates up to K' autocorrelation coefficients based on the squared spectral magnitude values A"(i), i=0,1, . . . , K'−1. It is possible to use an FFT to perform the IDFT of the processor 80.

The generated autocorrelation coefficients are then provided to a P-th order linear predictive analyzer 85 which generates P linear predictive coefficients (LPC's) corresponding to the transformed and warped spectral magnitude values A"(i). Then, the generated LPC's are quantized by a transformer/quantizer 90 to produce the coefficient sequence $\acute{\alpha}_1, \acute{\alpha}_2 \ldots \acute{\alpha}_P$. It is advantageous for the transformer/quantizer 90 to additionally transform the generated LPC's to a mathematically equivalent set of P values that are more amenable to quantization than typical LPC's prior to quantizing such values. The particular LPC transformation used by the processor 90 is not critical to practicing the invention and can include, for example, LPC transformations to conventional partial correlation (PARCOR) coefficients or line spectral pair (LSP) coefficients. The resulting coefficient sequence $\acute{\alpha}_1, \acute{\alpha}_2 \ldots \acute{\alpha}_P$ represents the short-term frequency spectrum of the frame sequence being processed by the encoder 20.

The exemplary embodiment of the short-term frequency spectrum processor 20, shown in FIG. 2, employs the spectral warper 65 and non-linear transformer 70 in a particular order to achieve improved perceptual coding of the short-term frequency spectrum of voiced speech frames of a speech signal. However, such enhanced characterization is alternatively achievable using the spectral warper 65 and transformer 70, individually or in a different order.

Figure 4:
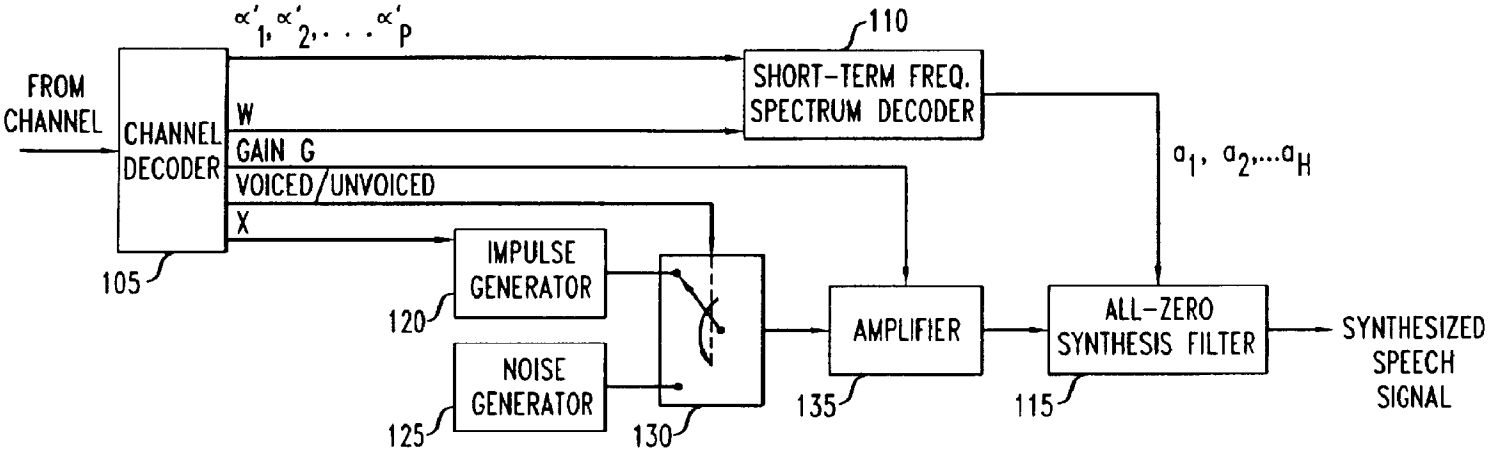
FIG. 4 illustrates a schematic block diagram of an exemplary speech decoder configuration employing a short-term frequency spectrum decoder according to the invention.

An exemplary decoder 100 for decoding coded signals for the respective speech frames generated by the coder 1 of FIG. 1 is shown in FIG. 4. In FIG. 4, the channel coded signals are detected by a channel decoder 105. The channel decoder 105 decodes the respective signals for the successive received speech frames encoded by the channel encoder 30 including the voiced/unvoiced status of the frame, the gain constant G, the signal W, the quantized coefficient sequence $\acute{\alpha}_1, \acute{\alpha}_2 \ldots \acute{\alpha}_P$ and pitch period duration X if the frame contains voiced speech. The coefficient sequence $\acute{\alpha}_1, \acute{\alpha}_2 \ldots \acute{\alpha}_P$ and signal W for a current speech frame being processed is provided to a short-term frequency spectrum decoder 110 which is described in greater detail below with regard to FIG. 5.

The short-term frequency spectrum decoder 110 produces, for example, corresponding all-zero filter coefficients $a_1, a_2, \ldots a_H$ for the processed frame based on an inverse non-linear transformation and/or spectral warping process of the transformed and/or warped short-term frequency spectrum represented by the coefficient sequence $\acute{\alpha}_1, \acute{\alpha}_2 \ldots \acute{\alpha}_P$. The generated filter coefficients $a_1, a_2, \ldots a_H$ are then provided to form an all-zero synthesis filter 115 for characterizing the spectral envelope that shapes the spectrum of synthesized speech corresponding to the speech frame.

The filter 115 uses the coefficients $a_1, a_2, \ldots a_H$ to modify the spectrum of an excitation sequence for the speech frame being processed to produce a synthesized speech signal corresponding to the original speech signal of FIG. 1. The particular method for producing the excitation sequence is not critical for practicing the invention and can be a conventional method. For instance, an exemplary method for generating the excitation sequence for the voiced speech frames is to rely on an impulse generator 120 for producing impulses separated by a pitch period duration. Also, a white noise generator 125, such as a Gaussian white noise generator, can be used to generate the necessary excitation for the unvoiced portions of the synthesized speech signal. A switch 130 coupled to the impulse generator 120 and white noise generator 125 is controlled by the voiced/unvoiced status signal for applying the respective outputs to a signal amplifier 135 for constructing the proper sequence for the excitation sequence based on the received speech frame information. For each frame, the magnitude of the amplification of the excitation signal by the amplifier 135 is based on the gain constant G of the frame received from the channel decoder 105.

Figure 5:
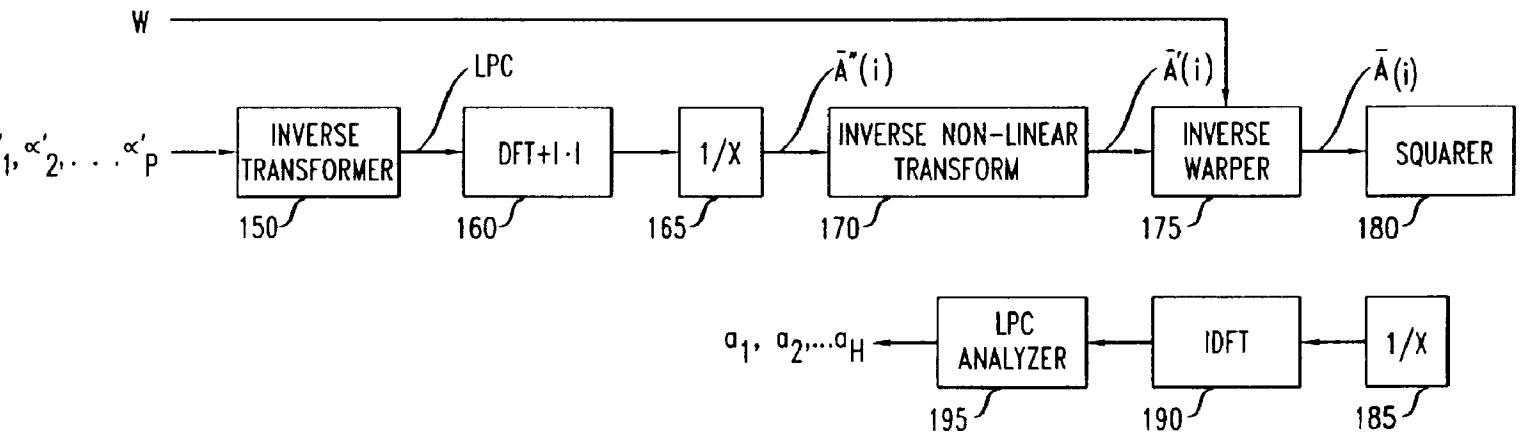
FIG. 5 is a schematic block diagram of an exemplary short-term frequency spectrum decoder according to the invention for use in the speech decoder of FIG. 4.

An exemplary configuration for the short-term frequency spectrum decoder 110 according to the invention is illustrated in FIG. 5. The decoder configuration of FIG. 5 operates in a substantially reverse manner to the configuration of the short-term encoder 20 of FIG. 2. In FIG. 5, the channel decoded coefficient sequence $\acute{\alpha}_1, \acute{\alpha}_2 \ldots \acute{\alpha}_P$ corresponding to the transformed and quantized LPC's for the speech frame being processed is provided to an inverse transformer 150 that transforms the sequence hack into the LPC's. More specifically, the inverse transformer 150 performs the inverse transformation to that performed by the transformer/quantizer 90 in the encoder 20 of FIG. 2. Accordingly, the LPC's produced by the inverse transformer 150 correspond to those signals generated by the LPC analyzer 85 in FIG. 2 during the encoding of the speech signal.

The LPC's generated by the inverse transformer 150 are provided to a spectral processor 160, such as a discrete Fourier transformer, which produces a corresponding intermediate value sequence of reciprocal spectral magnitude values representing the warped and transformed short-term frequency spectrum. The reciprocal sequence A"(i) of such values is then produced by processor 165 and corresponds to the transformed and warped spectrum represented in the sequence A"(i) produced by the non-linear transformer 70 in FIG. 2.

Each of the spectral magnitude values $\overline{A}$"(i) generated by the block 165 is then inverse non-linear transformed by the processor 170 to produce a spectrum sequence $\overline{A}$'(i) that corresponds to the warped spectrum sequence A'(i) produced by the spectral warper 65 in FIG. 2. The particular non-linear transformation used by transformer 170 in FIG. 4 should invert the non-linear transformation performed by the transformer 70 of FIG. 2. Thus, for example, if a square root was used as the non-linear transformer 70, then a square operation should be performed by the processor 170.

The inverse transformed spectral magnitude value sequence $\overline{A}$"(i) generated by the processor 170 is then provided to the inverse spectral warper 175 which produces a sequence of inverse spectral magnitude values $\overline{A}$(i), i=0, 1, . . . ,K"−1. The produced inverse spectral magnitude values $\overline{A}$(i) correspond to the original short-term spectrum represented in the sequence A(i) produced by the DFT transformer 60 in FIG. 2. The inverse spectral warper 175 of FIG. 4 also receives the warping signal W containing, for example, a codebook index of a spectral warping function used to code the spectral magnitude value sequence. A corresponding complimentary codebook in the decoder should contain an inverse spectral warping operation to that used by the coder 1 of FIG. 1 at the codebook entry indicated by the warping index signal W.

Although the previously described signal W indicates a respective codebook entry, it is alternatively possible, for the signal W to indicate the particular employed spectral warping operation performed by the encoder for the short-term frequency spectrum of respective speech frames in another manner. Also, the warping signal W can be omitted if the employed warping function for a coded speech frame is based on a property of the speech frame such as, for example, the duration of the pitch period. In such a system, the signal X indicating the pitch period duration for the interval should also be provided to the inverse warper 175.

In operation, if the spectral warper 65 of FIG. 2 changed the proportion of the total spectral values representing a frequency range of $Z_1$ to $Z_2$ during encoding of the speech signal as in the previously described example depicted in FIG. 3A, then the inverse warper 175 processes the magnitude values representing that frequency range to reduce the number of magnitude values substantially back to their original proportion. Numerous techniques can be used to process to achieve such an inverse spectral warping operation. For instance, in order to reduce the number of spectral magnitude values characterizing a particular frequency range by one-half, the inverse warper 175 could remove every other spectral value in the sequence that characterizes that frequency range, or substitute an average value for adjacent value pairs in such sequence.

Each of the K" inverse warped and transformed magnitude values in the sequence $\overline{A}$(i) are then squared by squarer 180 to produce a corresponding sequence of power spectral values. The reciprocal of each of the power spectral values is then generated by processor 185. Such a representation is required for the subsequent generation of the desired relative high order LPC all-zero synthesis filter coefficients $a_1, a_2, \ldots a_H$ that models the spectrum characterized by the sequence A(i). Since the coding method according to the invention often employs relatively high order modeling of the spectrum sequence $\overline{A}$(i), it is more advantageous to generate an all-zero filter model rather than all-pole model. Unstable predictive synthesis filters can be produced using truncated all-pole filter coefficients based on such relatively high order analysis. However, if an all-pole filter model is desired, then the processor 185 can be omitted from the decoder 110.

The reciprocal sequence of power spectral values produced by the processor 185 are provided to IDFT processor 190 which generates up to K" corresponding autocorrelation coefficients. It is possible to use an FFT to perform the IDFT of the processor 190. The generated autocorrelation coefficients are then provided to an H-th order linear predictive analyzer 195 which generates the H linear predictive filter coefficients $a_1$, $a_2, \ldots a_H$ corresponding to an inverse transformed and inverse warped spectral characterization of the short-term frequency spectrum of the voiced speech frame being processed. Such generated filter coefficients are useable for forming an all-zero synthesis filter 115, shown in FIG. 4, for shaping the spectral envelope of the synthesized speech corresponding to such a voiced speech frame.

Although the exemplary short-term frequency spectrum decoder 110 in FIG. 5 employs the inverse non-linear transformation and spectral warping in a particular order to achieve the enhanced characterization, it should be readily understood that such enhanced characterization is alternatively achievable using the inverse transformer 170 and inverse warper 175, individually or in a different order.

Figure 6A:
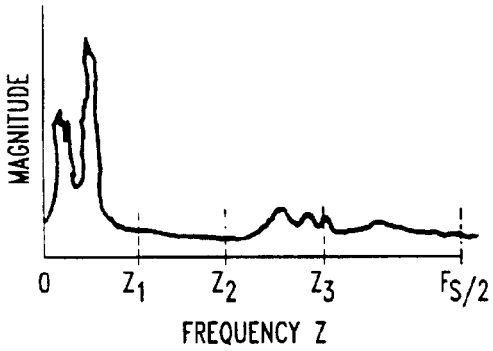
FIGS. 6A illustrates a graph of an exemplary short-term frequency spectrum represented by inverse warped spectral magnitude values generated by the decoder of FIG. 4 based on the warped spectral magnitude values represented in FIG. 3B.
Figure 6B:
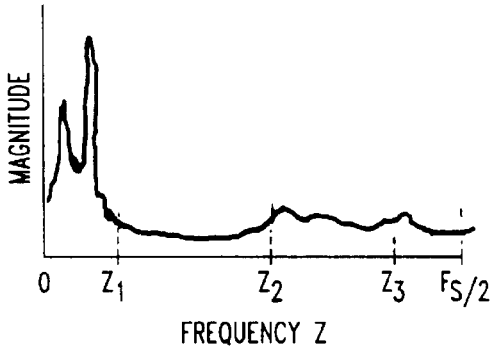
FIGS. 6B illustrates a graph of an exemplary short-term frequency spectrum represented by decoded non-warped spectral magnitude values based on the spectral magnitude values represented in FIG. 3A.

FIG. 6A illustrates an exemplary sequence of inverse warped spectral magnitudes for the speech signal interval that was spectrally warped in the previously described manner with respect to FIGS. 3A and 3B and coded using a 25-th order LPC analysis. FIG. 6B illustrates the spectral magnitudes of the same interval as depicted in FIG. 3A that was coded using conventional 25-th order LPC analysis without spectral warping. In FIG. 6A, the inverse warped spectral parameters characterizing the perceptually significant frequency ranges 0 to $Z_1$ and $Z_2$ to $Z_3$ more closely represent the original spectral magnitudes of FIG. 3A in these frequency ranges than the corresponding spectral parameters in FIG. 6B.

Figure 7:
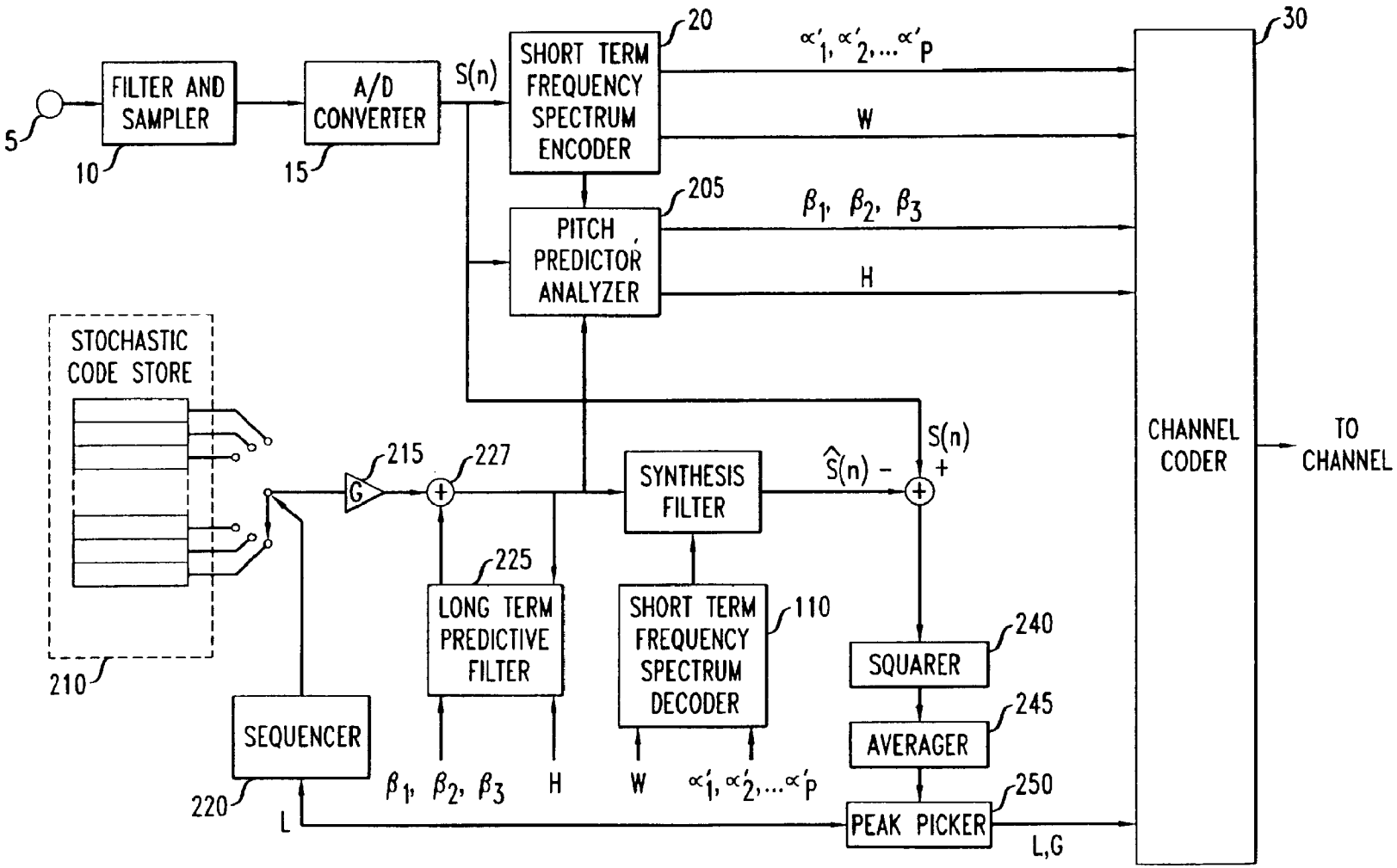
FIG. 7 illustrates a schematic block diagram of an exemplary codebook excitation linear predictive (CELP) coder employing the encoder of FIG. 2.
Figure 9:
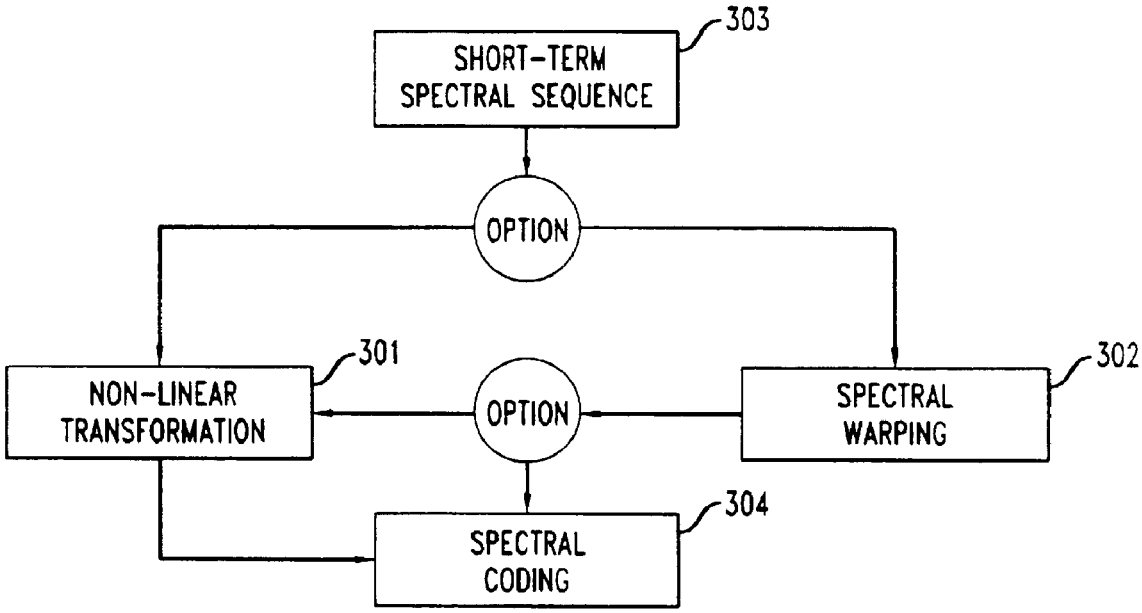
FIG. 9 is a block diagram of the inventive coding method in a broad aspect.

The method for encoding the short-term frequency spectrum of speech signals according to the invention has been described with respect to vocoder-type speech coders in FIGS. 1 through 6. However, the invention is useable in other types of coding systems including, for example, analysis-by-synthesis coding systems. An exemplary CELP analysis-by-synthesis coder 200 and decoder 300 according to the invention are depicted in FIGS. 6 and 7, respectively. Similar components in FIGS. 1 and 7 include like reference numbers for clarity, for example, A/D converter 15 and short-term frequency spectrum coder 20. Likewise, similar components in FIGS. 4 and 8 have also include like reference numbers, for example, short-term frequency spectrum decoder 110 and channel decoder 105.

Referring to the CELP coder 200 of FIG. 7, a speech pattern received by the microphone 5 is processed to produce digitized speech sequence S(n) by the filter and sampler 10 and A/D converter 15 as is previously described with respect to FIG. 1. The digitized speech sequence S(n) is then provided to the short-term frequency spectrum encoder 20 which produces the encoded short-term frequency spectrum coefficient sequence $\acute{\alpha}_1, \acute{\alpha}_2 \ldots \acute{\alpha}_P$ and warping signal W for successive frames of sequence S(n). The produced coefficient sequence $\acute{\alpha}_1, \acute{\alpha}_2 \ldots \acute{\alpha}_P$ and warping signal W which characterize the short-term frequency spectrum of the respective speech frames are provided to the channel coder 30 for coding and transmission or storage on the channel. Such generation of the encoded short-term frequency spectrum coefficient sequence $\acute{\alpha}_1, \acute{\alpha}_2 \ldots \acute{\alpha}_P$ and warping signal W is substantially identical to that previously described with respect to FIGS. 1 and 2.

The difference between the encoders 1 and 200 of FIGS. 1 and 7 concerns the coding of the prediction residual. The encoder 200 encodes the prediction residual based on long-term prediction analysis and codebook excitation entries while the coder 1 performs encoding of the prediction residual based on a relatively simple model of a periodic impulse train for voiced speech and white noise for unvoiced speech. The prediction residual is coded in FIG. 7 in the following manner. The digitized speech sequence S(n) is provided to a pitch predictor analyzer 205 which generates corresponding long-term filter tap coefficients $\beta_1$, $\beta_2$, $\beta_3$ and delay H based on the respective frames of the sequence S(n). Exemplary pitch predictor analyzers are described in greater detail in B. S. Atal, "Predictive Coding of Speech at Low Bit Rates", IEEE Trans. on Comm., vol. COM-30, pp. 600-614, (April 1982), which is incorporated by reference herein. The corresponding generated long-term filter tap coefficients $\beta_1$, $\beta_2$, $\beta_3$ and delay H for the respective frames are provided to the channel coder 30 for transmission or storage on the channel.

In addition, a stochastic codebook or code store 210 is employed which contains a fixed number, such as 1024, of random noise-like codeword sequences, each sequence including a series of random numbers. Each random number represents a series of pulses for a duration equivalent to the duration of a frame. Each codeword can be applied to a scaler 215 by a sequencer 220 scaled by a constant G. The scaled codeword is used as excitation of a long-term predictive filter 225 and a short-term predictive filter 230 which in combination with signal combiner 227 generates a synthesized digital speech signal sequence $\overline{S}(n)$. The long-term predictive filter 225 employs filter coefficients based on the long-term filter tap coefficients $\beta_1$, $\beta_2$, $\beta_3$ and delay H. Exemplary long-term predictive coders are described in greater detail in the previously cited "Predictive Coding of Speech at Low Bit Rates" article.

For each speech frame, the synthesis filter 230 uses the filter coefficients $a_1, a_2, \ldots a_H$ generated by the short-term frequency spectrum decoder 110 from the generated spectral coefficient sequence $\acute{\alpha}_1, \acute{\alpha}_2 \ldots \acute{\alpha}_P$ and warping signal W generated by the encoder 20. The operation of a suitable decoder for the decoder 110 is previously described with respect to FIG. 4. An error or difference sequence between the digitized speech sequence S(n) and the generated synthesized digital speech sequence $\overline{S}(n)$ for the each frame is produced by a signal combiner 235. The values of the error sequence is then squared by the squarer 240 and an average value based on the sequence is determined by an averager 245.

Then, a peak picker 250 controls the sequencer 220 to sequence through the codewords in the codebook 210 to select the an appropriate codeword and value for the gain G that produces a substantially minimum mean-squared error signal. The determined codebook index L and gain G are then provided to the channel coder 30 for coding and transmission or storage of the respective speech signal frame on the channel. In this manner, the system effectively selects a codeword excitation entry L and gain constant G that substantially reduces or minimizes the error or difference between the digitized speech S(n) and the corresponding synthesized speech sequence $\overline{S}(n)$.

Figure 8:
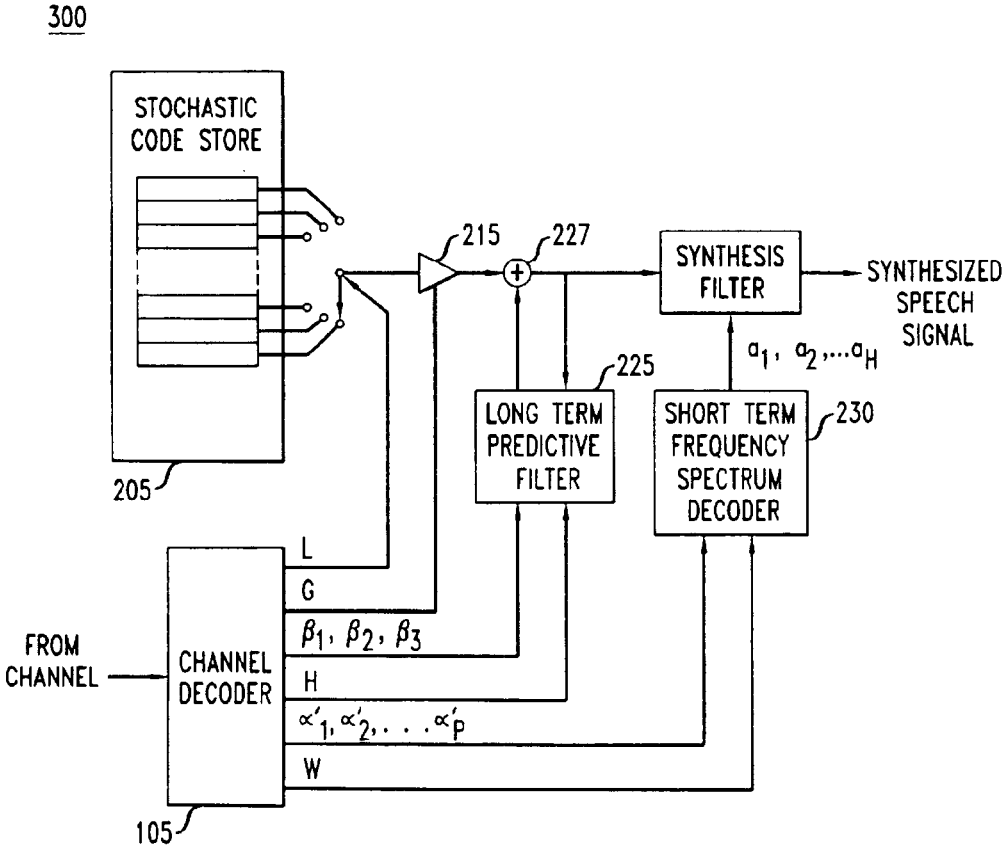
FIG. 8 illustrates a schematic block diagram of an exemplary CELP decoder employing the decoder of FIG. 5.

The decoder 300 of FIG. 8 is capable of decoding a CELP coded frame produced by the coder 200 if FIG. 7. Referring to FIG. 8, the channel decoder 105 decodes the coded sequence received from or read from the channel. The other components of the decoder 300 substantially correspond to those components in the coder used to synthesize the digital code sequence S(n) based on the received codeword entry L and the gain constant G for the respective frames of the speech signal. Accordingly, the speech signal $\overline{S}(n)$ generated by the component arrangement in FIG. 7 corresponds to the signal $\overline{S}(n)$ generated with the codeword excitation entry L and gain constant G that substantially reduced or minimized the difference between the original digitized speech S(n) and the speech digital code sequence $\overline{S}(n)$ in the coder 200 of FIG. 7.

Although several embodiments of the invention have been described in detail above, many modifications can be made without departing from the teaching thereof. All of such modifications are intended to be encompassed within the following claims. For example, although the previously described embodiments have employed LPC analysis to code the non-linear transformed and/or warped spectral parameters, such coding can be performed by numerous alternative techniques according to the invention. It is possible for such alternative techniques to include those techniques that code the frequency components of the short-term frequency spectrum by methods other than coding based on a corresponding perceptual quality or accuracy that such components would have in corresponding synthesized speech.

The invention claimed is:

1. A method for coding a speech signal to generate a coded signal comprising:

generating a sequence of spectral magnitude values for a frame interval of said speech signal representing voiced speech, said spectral magnitude value sequence characterizing spectral components of a short-term frequency spectrum of said interval;

performing [at least one of] a non-linear transformation [or spectral warping process] on said sequence to produce an intermediate spectral value sequence having an enhanced characterization of at least one particular frequency range relative to another frequency range in the intermediate spectral sequence; and coding said intermediate spectral value sequence to produce at least a portion of said coded signal for said interval of said speech signal.

2. The method of claim 1 wherein said coding step codes said processed spectral value sequence based on linear predictive analysis.

3. The method of claim 2 wherein said coding step comprises:

inverse transforming said intermediate spectral values into a time domain representation signal; and generating linear predictive codes for said time domain representation signal.

4. The method of claim 1 wherein said step of performing non-linear transformation includes processing at least a portion of said spectral magnitude value sequence according to the expression $[[A(i)]^N]$ $[A(i)]^N$, where A(i) represents the respective values in said sequence portion and the value N is not 0 or 1.

5. The method of claim 4 where the value N is a value less than 0 and not less than −1.

6. The method of claim 1, *further comprising performing a spectral warping process on said sequence of spectral magnitude values, and* wherein said coding step includes generating a warp code for said coded signal indicating a portion of said sequence warped by said warping process.

7. The method of claim 6 wherein said warp code is an index of an entry in a warping function codebook.

8. The method of claim 1 *further comprising performing spectral warping on said sequence to produce an intermediate spectral value sequence having an enhanced characterization of at least one particular frequency range relative to another frequency range in the intermediate spectral sequence,* wherein said step of performing spectral warping comprises increasing the number of values in a portion of said intermediate spectral value sequence characterizing a particular frequency range that would effect the perceptual quality of a correspond speech signal synthesized from said coded signal.

9. The method of claim 8 wherein said step of performing spectral warping comprises decreasing the number of values in at least one other portion of said intermediate spectral value sequence characterizing another particular frequency range.

10. The method of claim 1 wherein the particular operation performed for said non-linear transformation [or spectral warping process] is based on a property of said speech signal.

11. The method of claim 10 wherein said property of said speech signal is a duration of a pitch period of said frame interval.

[12. The method of claim 1 wherein the particular frequency range represented in the spectral magnitude value sequence that is warped by said warping process is selected based on the value magnitudes representing the signal energy for such frequency range.]

13. The method of claim 1 wherein said coding step performs analysis-by-synthesis coding.

14. The method of claim 13 wherein said analysis-by-synthesis coding is code-excited linear prediction analysis.

15. The method of claim 1 wherein said step of generating said spectral magnitude value sequence characterizing said short-term frequency spectrum generates such sequence based on spectral components of at least one pitch period interval in said frame.

16. The method of claim 15 wherein said step of generating the sequence of spectral magnitude values comprises:

identifying a portion of said frame interval of said speech signal representing a pitch period;

performing a discrete Fourier transform of said identified portion of said frame interval to generate a sequence of spectral component values; and determining respective magnitudes of said spectral component values to produce said spectral magnitude value sequence for said frame interval.

17. A method for decoding a coded speech signal, said coded signal including successive coded frame intervals of a speech signal, the decoding of a frame interval of said coded signal comprising the steps of:

generating an intermediate spectral value sequence for at least a portion of said interval representing voiced speech, said intermediate spectral value sequence characterizing spectral components of a short-term frequency spectrum of said interval and further having an enhanced characterization of at least one particular frequency range relative to another frequency range; and processing said intermediate spectral value sequence with [at least one of] an inverse non-linear transformation [or inverse spectral warping process] to produce a sequence of spectral magnitude values characterizing the short-term frequency spectrum for the voiced portion of said interval.

18. The method of claim 17 wherein said short-term frequency spectrum represented in said intermediate spectral value sequence is a pitch period of voiced speech represented in said interval.

19. The method of claim 17 wherein said step of processing by inverse non-linear transformation includes processing at least a portion of said spectral magnitude value sequence according to the expression $[[\overline{A}'(i)]^N]$ $[\overline{A}'(i)]^N$, where $[\overline{A}''(i)]$ $\overline{A}'(i)$ represents the respective values in said sequence portion and the value N is not 0 or 1, and wherein said expression performs an inverse transformation of a non-linear transformation used in coding said coded signal interval.

20. The method of [claim 17 further comprises the step of] *claim 17, further comprising processing said intermediate spectral value sequence with an inverse spectral warping process, and* receiving a warp code for said coded signal interval indicating a portion of said intermediate spectral value sequence warped during said coded signal interval.

21. The method of claim 20 wherein said warp code is an index of an entry in a warping function codebook.

22. The method of claim 17 *further comprising processing said intermediate spectral value sequence with an inverse spectral warping process to produce a sequence of spectral magnitude values characterizing the short-term frequency spectrum for the voiced portion of said interval,* wherein said step of processing by inverse warping said intermediate spectral value sequence comprises adjusting a number of spectral values in the intermediate spectral value sequence characterizing at least one particular frequency range in producing said spectral magnitude value sequence and wherein said spectral value adjustment corresponds to inverse warping used in coding said coded signal interval.

23. The method of claim 17 wherein the particular operation performed for said inverse non-linear transformation [or spectral warping process] is based on a property of said coded speech signal.

24. The method of claim 23 wherein said property of said speech signal is a duration of a pitch period in said coded speech signal interval.

25. The method of claim 17 wherein said generating step includes analysis-by-synthesis decoding.

26. The method of claim 25 wherein said analysis-by-synthesis decoding is based on code-excited linear prediction analysis and comprises receiving codes identifying a respective excitation codebook entry corresponding to said interval.

27. A coder for generating a coded signal based on a speech signal comprising:

a spectral transformer for generating a sequence of spectral magnitude values for a frame interval of said speech signal representing voiced speech, said spectral magnitude value sequence characterizing spectral components of a short-term frequency spectrum of said frame interval;

an encoder coupled to said spectral processor, said encoder for performing [at least one of] a non-linear transformation [or a spectral warping process] on said sequence to produce an intermediate spectral value sequence having an enhanced characterization of at least one particular frequency range relative to another frequency range in the intermediate spectral sequence; and a spectral coder coupled to said encoder, said spectral coder for coding said intermediate spectral value sequence to produce at least a portion of said coded signal for said interval of said speech signal.

28. The coder of claim 27 wherein said spectral coder comprises:

an inverse transformer for inverse transforming said spectral parameters processed by said spectral processor into a time domain representation signal; and a linear predictive code generator for generating linear predictive coefficients for said coded signal based on said time domain representation signal for said interval of said speech signal.

29. The coder of claim 27 wherein said spectral coder includes a vocoder.

30. The coder of claim 27 wherein said spectral coder includes an analysis-by-synthesis coder.

31. The coder of claim 30 wherein said analysis-by-synthesis coder is a code-excited linear prediction coder.

32. The coder of claim 27 wherein said spectral transformer for generating said spectral magnitude value sequence characterizing spectral components of a short-term frequency spectrum performs a transformation based on at least one pitch period represented in said interval.

33. The coder of claim 32 wherein said spectral transformer comprises:

a window processor and pitch detector for identifying an interval in said frame interval of said speech signal representing a pitch period; and a discrete Fourier transformer coupled to said window processor, said discrete Fourier transformer for generating said spectral magnitude value sequence for said interval.

34. A coder for generating a coded signal from a speech signal comprising:

means for generating a sequence of spectral magnitude values for a frame interval of said speech signal representing voiced speech, said spectral magnitude value sequence characterizing spectral components of a short-term frequency spectrum of said interval;

means for performing [at least one of] a non-linear transformation [or spectral warping process] on said sequence to produce an intermediate spectral value sequence having an enhanced characterization of at least one particular frequency range relative to another frequency range in the intermediate spectral sequence; and means for coding said intermediate spectral value sequence to produce at least a portion of said coded signal for said interval of said speech signal.

35. A decoder for decoding a coded speech signal, said coded signal including successive coded frame intervals of a speech signal, said decoder comprising:

a spectral decoder, said spectral decoder for generating an intermediate spectral value sequence for voiced speech represented in said frame interval of the coded signal, said intermediate spectral value sequence characterizing spectral components of a short-term frequency spectrum of said voiced speech and further having an enhanced characterization of at least one particular frequency range relative to another frequency range; and inverse processor coupled to said spectral decoder, said inverse processor for processing said intermediate spectral value sequence with [at least one of] an inverse non-linear transformation [or inverse spectral warping process] to produce a sequence of spectral magnitude values characterizing a short-term frequency spectrum for the voiced portion of said interval.

36. The decoder of claim 35 wherein said spectral decoder includes an analysis-by-synthesis decoder.

37. The decoder of claim 35 wherein said analysis-by-synthesis decoder performs code-excited linear prediction analysis.

38. A decoder for decoding a coded speech signal, said coded signal including successive coded frame intervals of a speech signal, said decoder comprising:

means for generating an intermediate spectral value sequence for voiced speech represented in said frame interval of the coded signal, said intermediate spectral value sequence characterizing spectral components of a short-term speech spectrum of voiced speech represented in said interval and further having an enhanced characterization of at least one particular frequency range relative to another frequency range; and means for processing said intermediate spectral value sequence with [at least one of] an inverse non-linear transformation [or inverse spectral warping process] to produce a sequence of spectral magnitude values characterizing said short-term frequency spectrum for the voiced portion of said interval.

* * * * *